(12) United States Patent
Zhou et al.

(10) Patent No.: US 9,949,181 B2
(45) Date of Patent: *Apr. 17, 2018

(54) ACCESS TERMINAL ADAPTATION OF HANDOVER PARAMETER

(71) Applicant: QUALCOMM Incorporated, San Diego, CA (US)

(72) Inventors: Yan Zhou, San Diego, CA (US); George Cherian, San Diego, CA (US); Hemanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 873 days.

This patent is subject to a terminal disclaimer.

(21) Appl. No.: 13/767,637

(22) Filed: Feb. 14, 2013

(65) Prior Publication Data

US 2014/0226493 A1   Aug. 14, 2014

(51) Int. Cl.
*H04W 36/00* (2009.01)
*H04W 36/36* (2009.01)

(52) U.S. Cl.
CPC ....... *H04W 36/0083* (2013.01); *H04W 36/36* (2013.01)

(58) Field of Classification Search
CPC .... H04L 12/5692; H04W 4/02; H04W 24/02; H04W 24/04; H04W 24/10; H04W 36/00;
(Continued)

(56) References Cited

U.S. PATENT DOCUMENTS 5,995,836 A * 11/1999 Wijk et al. ............. 455/436
6,181,943 B1   1/2001 Kuo et al.
(Continued)

FOREIGN PATENT DOCUMENTS

EP   1835780 A2   9/2007
EP   2166796 A1   3/2010
(Continued)

OTHER PUBLICATIONS

Jansen et al., Handover parameter optimization in LTE self-organizing networks, Sep. 9, 2010, IEEE, Vehicular Technology Conference Fall (VTC 2010-Fall), 2010 IEEE 72nd, p. 1-5.*

(Continued)

*Primary Examiner* — Eric Nowlin
(74) *Attorney, Agent, or Firm* — Patterson & Sheridan, L.L.P.

(57) ABSTRACT

An access terminal adapts (e.g., self-optimizes) at least one handover parameter used by the access terminal for determining whether and/or how to handover from one access point to another access point. In addition, the access terminal uses different handover parameters for handover between different pairs of access points. For each of the access point pairs, the access terminal maintains a record of any handover issues that occur during handover of the access terminal between the access points. In the event a handover issue arises for a given pair of access points, the access terminal may adapt the handover parameter(s) associated with that access point pair in an attempt to mitigate the handover issue. In the event handover parameter adaptation occurs or occurs too frequently, the access terminal may store the adapted handover parameters for use during a subsequent handover operation and/or handover parameter adaptation operation.

26 Claims, 10 Drawing Sheets

(58) Field of Classification Search
CPC ......... H04W 36/0005; H04W 36/0016; H04W 36/0022; H04W 36/0066; H04W 36/0072; H04W 36/0083; H04W 36/0094; H04W 36/08; H04W 36/10; H04W 36/12; H04W 36/14; H04W 36/16; H04W 36/18; H04W 36/24; H04W 36/30; H04W 36/34; H04W 48/04; H04W 64/00; H04W 84/045; H04J 11/0093

USPC .......... 455/67.11, 67.13, 434, 436, 437, 450, 455/552.1; 370/252, 254, 328, 329, 331, 370/332

See application file for complete search history.

(56) References Cited

U.S. PATENT DOCUMENTS

| | | | |
|---|---|---|---|
| 6,285,883 B1 | 9/2001 | Bringby et al. | |
| 6,745,033 B1* | 6/2004 | Shah et al. | 455/436 |
| 6,813,495 B2* | 11/2004 | Sasaki | H04W 36/18 370/331 |
| 6,907,244 B2* | 6/2005 | Santhoff | G01S 13/878 342/357.64 |
| 7,697,948 B2* | 4/2010 | Wan | H04L 1/1812 455/452.2 |
| 7,805,142 B2* | 9/2010 | Calin | H04W 36/22 370/331 |
| 8,249,599 B2* | 8/2012 | Kawasaki | H04W 52/242 370/331 |
| 8,345,632 B2* | 1/2013 | Mildh | H04W 72/0406 370/331 |
| 8,437,310 B2* | 5/2013 | Evans | H04W 36/0083 370/331 |
| 8,446,880 B2* | 5/2013 | Park | H04W 36/32 370/332 |
| 8,462,752 B2* | 6/2013 | Mildh | H04W 72/0406 370/338 |
| 8,526,980 B2* | 9/2013 | Ebata | H04W 16/20 370/338 |
| 8,559,298 B2* | 10/2013 | Catovic | H04W 36/0083 370/216 |
| 8,559,389 B2* | 10/2013 | Makabe | H04W 36/0088 370/331 |
| 8,626,172 B2* | 1/2014 | Dravida | H04W 36/0066 370/328 |
| 8,630,647 B2* | 1/2014 | Magadi Rangaiah | H04W 48/20 370/331 |
| 8,737,359 B2* | 5/2014 | Catovic et al. | 370/332 |
| 8,818,376 B2* | 8/2014 | Yiu et al. | 455/436 |
| 8,818,382 B2* | 8/2014 | Budic | H04W 52/143 455/443 |
| 8,855,623 B2* | 10/2014 | Sugahara | H04W 24/10 455/352 |
| 8,918,097 B2* | 12/2014 | Dillon | H04W 36/30 340/13.31 |
| 8,989,762 B1* | 3/2015 | Negus | H04W 24/02 370/341 |
| 9,060,314 B2* | 6/2015 | Magadi Rangaiah | H04W 48/20 |
| 9,100,874 B2* | 8/2015 | Yaqub | H04W 28/24 |
| 9,107,133 B2* | 8/2015 | Catovic | H04W 36/30 |
| 9,173,163 B2* | 10/2015 | Karaoguz | H04W 48/18 |
| 9,253,689 B2* | 2/2016 | Venkatachari | H04W 36/0055 |
| 9,277,467 B2* | 3/2016 | Hwang | H04W 36/0083 |
| 9,301,304 B2* | 3/2016 | Liu | H04W 64/006 |
| 9,313,702 B2* | 4/2016 | Virtej | H04W 24/10 |
| 9,357,440 B2* | 5/2016 | Ji | H04W 36/0016 |
| 9,357,451 B2* | 5/2016 | Islam | H04W 36/0083 |
| 9,357,464 B2 | 5/2016 | Olofsson et al. | |
| 9,398,509 B1* | 7/2016 | Braun | H04W 36/0094 |
| 9,451,521 B2* | 9/2016 | Kapoulas | H04W 36/32 |
| 9,516,646 B2* | 12/2016 | Urabe | H04L 29/06 |
| 9,578,561 B2* | 2/2017 | Kapoulas | H04W 36/0083 |
| 9,838,929 B2* | 12/2017 | Watanabe | H04W 36/08 |
| 2002/0042273 A1* | 4/2002 | Sasaki | H04W 36/18 455/442 |
| 2005/0026615 A1* | 2/2005 | Kim | H04W 36/0072 455/436 |
| 2005/0048978 A1* | 3/2005 | Santhoff | G01S 13/878 455/442 |
| 2005/0201333 A1* | 9/2005 | Santhoff | G01S 13/878 370/333 |
| 2005/0226188 A1* | 10/2005 | Santhoff | G01S 13/878 370/335 |
| 2005/0255847 A1 | 11/2005 | Han et al. | |
| 2006/0003768 A1* | 1/2006 | Chiou | 455/436 |
| 2007/0037603 A1* | 2/2007 | Dravida | H04W 36/0066 455/552.1 |
| 2007/0206552 A1* | 9/2007 | Yaqub | H04W 28/24 370/338 |
| 2007/0298822 A1* | 12/2007 | Wan | H04L 1/1812 455/509 |
| 2008/0132232 A1* | 6/2008 | Tomizu | H04W 36/0083 455/436 |
| 2009/0137240 A1* | 5/2009 | Dillon | H04W 36/30 455/423 |
| 2009/0154426 A1* | 6/2009 | Perraud | H04W 36/26 370/332 |
| 2009/0197605 A1* | 8/2009 | Kawasaki | H04W 52/242 455/437 |
| 2009/0239532 A1* | 9/2009 | Ebata | H04W 16/20 455/434 |
| 2009/0323638 A1* | 12/2009 | Catovic | H04W 36/0083 370/331 |
| 2010/0067487 A1* | 3/2010 | Makabe | H04W 36/0088 370/331 |
| 2010/0142486 A1* | 6/2010 | Wahlqvist | H04W 72/0406 370/332 |
| 2010/0173626 A1* | 7/2010 | Catovic | H04W 76/027 455/423 |
| 2010/0195618 A1* | 8/2010 | Park | H04W 36/32 370/331 |
| 2010/0273487 A1* | 10/2010 | Alonso-Rubio et al. | 455/436 |
| 2010/0284374 A1* | 11/2010 | Evans | H04W 36/0083 370/332 |
| 2010/0298001 A1* | 11/2010 | Dimou et al. | 455/441 |
| 2011/0026492 A1* | 2/2011 | Frenger et al. | 370/331 |
| 2011/0044285 A1 | 2/2011 | Jang et al. | |
| 2011/0223914 A1 | 9/2011 | Hashimoto | |
| 2012/0003979 A1* | 1/2012 | Sugahara | H04W 24/10 455/436 |
| 2012/0088507 A1 | 4/2012 | Legg et al. | |
| 2012/0135731 A1* | 5/2012 | Rangaiah | H04W 48/20 455/434 |
| 2012/0165024 A1 | 6/2012 | Sugahara et al. | |
| 2012/0176892 A1* | 7/2012 | Yamamoto et al. | 370/221 |
| 2012/0252440 A1* | 10/2012 | Watanabe | H04W 24/02 455/423 |
| 2012/0286967 A1* | 11/2012 | Alteirac | E21B 47/12 340/853.7 |
| 2013/0150053 A1* | 6/2013 | Hwang | H04W 36/0083 455/440 |
| 2013/0231116 A1* | 9/2013 | Mildh | H04W 72/0406 455/436 |
| 2013/0273919 A1* | 10/2013 | Sashihara | H04W 36/0083 455/436 |
| 2014/0011511 A1* | 1/2014 | Budic | H04W 52/143 455/452.1 |
| 2014/0128077 A1* | 5/2014 | Magadi Rangaiah | H04W 48/20 455/436 |
| 2014/0141785 A1* | 5/2014 | Wang | H04W 36/32 455/441 |
| 2014/0226620 A1 | 8/2014 | Zhou et al. | |
| 2014/0256325 A1* | 9/2014 | Hoirup | H04B 1/0458 455/436 |
| 2014/0287770 A1* | 9/2014 | Liu | H04W 64/006 455/450 |
| 2015/0016378 A1* | 1/2015 | Urabe | H04L 29/06 370/329 |

(56) References Cited

U.S. PATENT DOCUMENTS

| | | | |
|---|---|---|---|
| 2015/0119039 A1* | 4/2015 | Virtej | H04W 24/10 |
| | | | 455/436 |
| 2015/0141018 A1* | 5/2015 | Kapoulas | H04W 36/0083 |
| | | | 455/437 |
| 2015/0141021 A1* | 5/2015 | Kapoulas | H04W 36/32 |
| | | | 455/441 |
| 2015/0172966 A1 | 6/2015 | Watanabe | |
| 2015/0200709 A1* | 7/2015 | Negus | H04W 24/02 |
| | | | 375/146 |
| 2015/0208308 A1* | 7/2015 | Watanabe | H04W 36/08 |
| | | | 455/436 |
| 2015/0223111 A1* | 8/2015 | Lindoff | H04W 24/02 |
| | | | 370/252 |
| 2016/0198385 A1* | 7/2016 | Braun | H04W 36/0094 |
| | | | 455/437 |
| 2017/0006479 A1* | 1/2017 | Smith | H04W 24/02 |
| 2017/0055272 A1* | 2/2017 | Bando | H04W 72/02 |
| 2017/0079042 A1* | 3/2017 | Urabe | H04L 29/06 |
| 2017/0135020 A1* | 5/2017 | Kapoulas | H04W 36/32 |
| 2017/0208600 A1* | 7/2017 | Hsu | G01S 11/10 |
| 2017/0311426 A1* | 10/2017 | Schroder | H05B 37/0272 |
| 2017/0353897 A1* | 12/2017 | Wang | H04W 36/08 |
| 2017/0374534 A1* | 12/2017 | Nielsen | H04W 36/24 |

FOREIGN PATENT DOCUMENTS

| | | |
|---|---|---|
| EP | 2605585 A1 | 6/2013 |
| GB | 2394146 A | 4/2004 |
| JP | 2010525735 A | 7/2010 |
| JP | 2011510580 A | 3/2011 |
| WO | 2007056008 A2 | 5/2007 |
| WO | WO-2008133566 A1 | 11/2008 |
| WO | 2009053710 A1 | 4/2009 |
| WO | WO-2009092990 A1 | 7/2009 |
| WO | WO-2010002926 A1 | 1/2010 |
| WO | WO-2010080849 A2 | 7/2010 |
| WO | WO-2011058818 A1 | 5/2011 |
| WO | WO-2012090357 A1 | 7/2012 |

OTHER PUBLICATIONS

Werner et al., Handover Parameter Optimization in WCDMA Using Fuzzycontrolling, Sep. 7, 2007, IEEE, Personal, Indoor and Mobile Radio Communications, 2007. PIMRC 2007. IEEE 18th International Symposium on, p. 1-5.*

Alonso-Rubio, Self-Optimization for Handover Oscillation Control in LTE, 2010, IEEE, Network Operations and Management Symposium (NOMS), p. 950-953.*

International Search Report and Written Opinion—PCT/US2014/015682—ISA/EPO—dated Jun. 24, 2014.

Alcatel-Lucent: "Stage 2 definitions for Rel-10 intra-LTE MRO," Discussion and Approval, 3GPP TSG RAN WG3 Meeting #75 Dresden, R3-120264, Germany, Feb. 6-10, 2012, 32 pages.

* cited by examiner

ACCESS TERMINAL ADAPTATION OF HANDOVER PARAMETER

CROSS-REFERENCE TO RELATED APPLICATION

This application is related to concurrently filed and commonly owned U.S. patent application Ser. No. 13/767,648, entitled "ACCESS TERMINAL MAINTENANCE OF HANDOVER PARAMETER FOR SOURCE AND TARGET ACCESS POINT PAIRS," the disclosure of which is hereby incorporated by reference herein.

BACKGROUND

Field

This application relates generally to wireless communication and more specifically, but not exclusively, to adapting handover parameters at an access terminal.

Introduction

A wireless communication network provides various types of service (e.g., voice, data, multimedia services, etc.) to users within the coverage area of the network. In some types of networks, access points are distributed throughout a geographical area to provide wireless connectivity for access terminals that are operating within that geographical area. In general, at a given point in time, an access terminal will be served by a given one of these access points. As the access terminal roams throughout the geographical area, the access terminal may move away from its serving access point and move closer to another access point. In addition, signal conditions within a given area may change over time (e.g., due to fading and/or interference), whereby an access terminal may be better served by another access point. In these cases, to maintain mobility for the access terminal, the access terminal may be handed-over from its serving access point to the other so-called target access point.

Ideally, handover occurs in a seamless and reliable manner. In practice, however, various issues may arise during handover.

As one example, an access terminal at a handover boundary between two access points may be frequently handed-over between the two access points. For example, the signal quality seen by the access terminal at this boundary may fluctuate due to fading or other signal conditions. Consequently, at one point in time, the access terminal determines that a second access point provides better signal quality than a first access point and, as a result, initiates handover from the first access point to the second access point. When signal conditions change a short time later, the access terminal determines that the first access point provides better signal quality than the second access point and initiates handover back to the first access point. When signal conditions change again, the access terminal initiates handover back to the second access point, and so on. This condition may be referred to as frequent handover (FHO).

As another example, after handover of an access terminal from a first access point to a second access point is commenced (e.g., due to deterioration of the link between the first access point and the access terminal) but before the handover is completed, the link between the access terminal and the first access point may fail (e.g., due to further deterioration of the link). This condition may be referred to as too-late handover (TLHO) since, in some aspects, the access terminal should have been handed-over to the second access point sooner (i.e., before the link to the first access point failed).

As yet another example, shortly after handover of an access terminal from a first access point to a second access point, the link between the access terminal and the second access point may fail (e.g., due to a poor link between the second access point and the access terminal). This condition may be referred to as too-early handover (TEHO) since, in some aspects, the access point should not have been handed-over to the second access point because the second access point could not yet provide sufficient service for the access terminal.

In conventional wireless networks such a cellular networks, handover is controlled by the network (e.g., by the core network and/or the access points). Consequently, handover problems such as FHO, TLHO, and TEHO are addressed by the core network. For example, a core network entity detects handover problems and defines the parameters used for handover to reduce the handover problems.

SUMMARY

A summary of several sample aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to an access terminal (e.g., an IEEE 802.11-based station (STA)) that detects and manages handover issues such as FHO, TLHO, and TEHO. To this end, an access terminal may adapt (e.g., self-optimize) at least one handover parameter used by the access terminal to determine whether and/or how to handover from one access point to another access point.

In some aspects, the access terminal uses a dedicated handover parameter (or dedicated handover parameters) for handover between a designated pair of access points. That is, the access terminal may use different handover parameters for handover between different pairs of access points. For example, a first set of handover parameters may be designated for handover between a first pair of access points, a second set of handover parameters may be designated for handover between a second pair of access points, and so on.

For each of these access point pairs, the access terminal maintains a record of any handover issues that occur during handover of the access terminal between the access points. In the event a handover issue arises for a given pair of access points, the access terminal will adapt the handover parameter(s) associated with that access point pair in an attempt to mitigate the handover issue. Several examples follow.

In the event a FHO issue is detected for a given pair of access points, the access terminal may adapt at least one handover parameter that is used by the access terminal for handover between that pair of access points. The access terminal keeps track of the occurrence (optionally, the frequency) of handovers between these access points. If handovers occur or occur too frequently between these two access points, the access terminal adapts one or more of its handover parameters in an attempt to eliminate the FHO condition for this pair of access points.

In the event a TLHO issue is detected for a given pair of access points, the access terminal may adapt at least one handover parameter that is used by the access terminal for handover between that pair of access points. For handover from a first access point to a second access point of the designated pair, the access terminal keeps track of the occurrence of too-late handovers. If a too-late handover occurs (or too-late handovers occur too frequently), the access terminal adapts one or more of its handover parameters in an attempt to eliminate the TLHO condition for handovers from the first access point to the second access point.

In the event a TEHO issue is detected for a given pair of access points, the access terminal may adapt at least one handover parameter that is used by the access terminal for handover between that pair of access points. For handover from a first access point to a second access point of the designated pair, the access terminal keeps track of the occurrence of too-early handovers. If a too-early handover occurs (or too-early handovers occur too frequently), the access terminal adapts one or more of its handover parameters in an attempt to eliminate the TEHO condition for handovers from the first access point to the second access point.

An access terminal may maintain a record of the handover parameters that were adapted for a given pair of access points. For example, in the event a handover parameter adaptation occurs (e.g., once or frequently), the access terminal may store the adapted handover parameters for use during a subsequent handover parameter adaptation operation and/or a subsequent handover operation. For example, the access terminal may use the stored parameters rather than default parameters when commencing a subsequent handover parameter adaptation operation. As another example, the access terminal may automatically use the stored parameters whenever a handover decision is to be made regarding that pair of access points (e.g., instead of the access terminal's current handover parameters or default handover parameters). In this way, the access terminal may more readily identify the handover parameters that should be used for a given handover decision since repetitive adaptation processes may be avoided.

BRIEF DESCRIPTION OF THE DRAWINGS

These and other sample aspects of the disclosure will be described in the detailed description and the claims that follow, and in the accompanying drawings, wherein:

Figure 1:
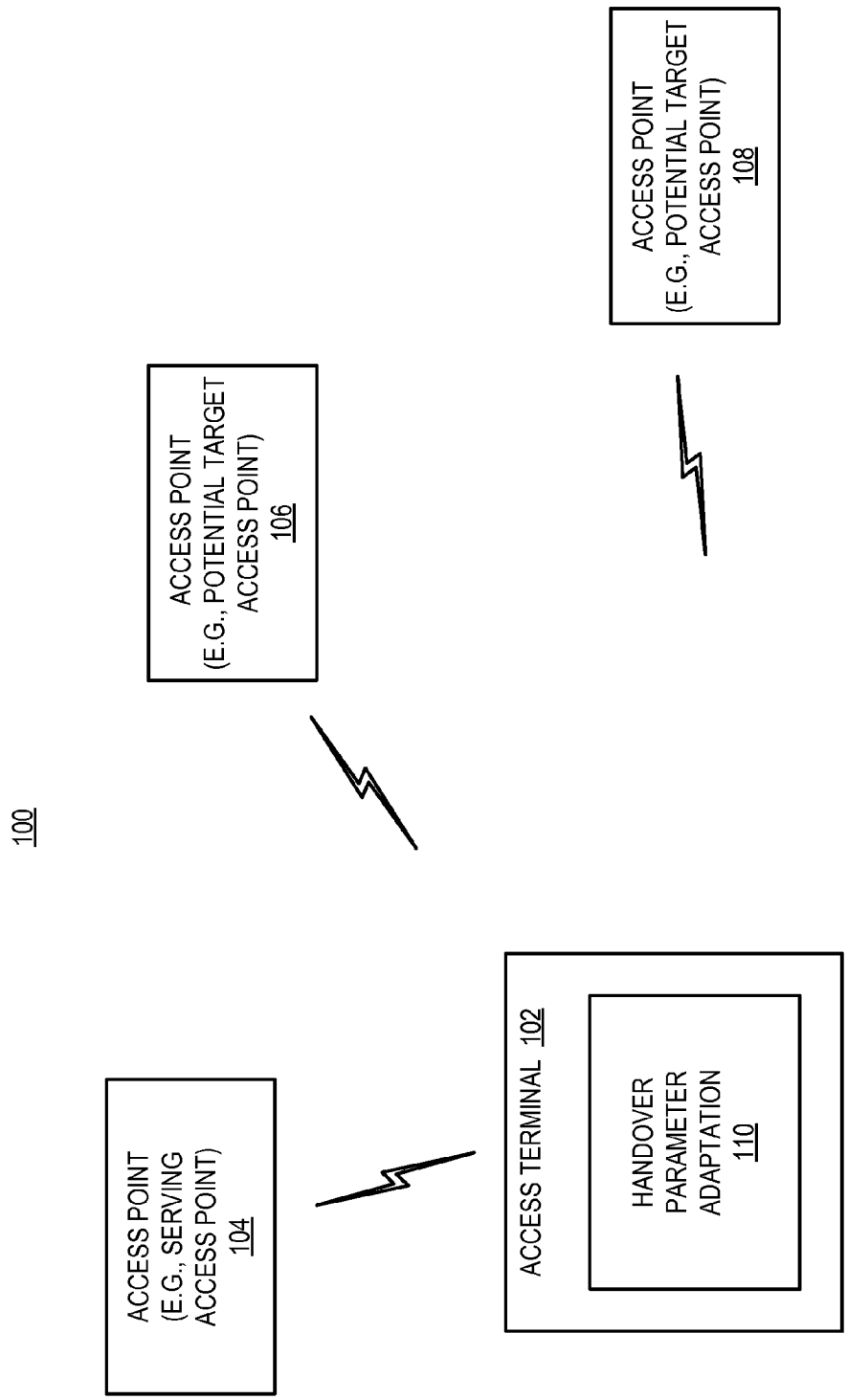
FIG. 1 is a simplified block diagram of several sample aspects of a communication system employing access terminal-based handover parameter adaptation.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, a method of communication comprises: receiving signals associated with handover of an apparatus between a first access point and a second access point; detecting at least one occurrence of a handover issue associated with the handover of the apparatus between the first access point and the second access point; and adapting at least one handover parameter used for handover of the apparatus between the first access point and the second access point, wherein the adaptation of the at least one handover parameter is based on the detection of the at least one occurrence of the handover issue. In addition, in some aspects, the handover issue may comprise frequent handover, too-late handover, or too-early handover.

FIG. 1 illustrates several nodes of a sample communication system 100 (e.g., a portion of a communication network). For illustration purposes, various aspects of the disclosure will be described in the context of one or more access points and one or more access terminals that communicate with one another. It should be appreciated, however, that the teachings herein may be applicable to other types of apparatuses or other similar apparatuses that are referenced using other terminology. For example, in various implementations access points may be referred to or implemented as base stations, radio base stations, and so on, while access terminals may be referred to or implemented as stations (e.g., STAs), mobile stations, user equipment (UEs), and so on.

Access points in the system 100 provide access to one or more services (e.g., network connectivity) for one or more access terminals that may be installed within or that may roam throughout coverage areas provided by the system 100. For example, at various points in time an access terminal 102 may connect to an access point 104, an access point 106, an access point 108, or some access point in the system 100 (not shown). Each of these access points may communicate with one or more network entities (not shown) to facilitate wide area network connectivity.

To account for changing channel conditions (e.g., fading and/or interference) and/or movement of an access terminal, the access terminal is configured to automatically handover from its current serving access point to another access point in the event better service may be obtained from the other access point. To this end, the access terminal may monitor signals from other access points (so-called potential target access points) to determine whether another access point may provide better service than the current serving access point for the access terminal.

In some aspects, a decision regarding whether another access point provides better service is based on a handover parameter (e.g., a hysteresis parameter) that specifies (e.g., in dB) how much stronger the received signal from a potential target access point needs to be than the received signal from the serving access point. In some aspects, a hysteresis parameter determines an offset added to the signal quality of each received signal from a designated pair of access points. For example, if the RSSI measured at the access terminal for a potential target access point is higher than the RSSI measured at the access terminal for the serving access point by at least the amount specified by the hysteresis (Hys) parameter, handover of the access terminal from the serving access point (the source access point for the handover) to the target access point is triggered.

In some cases, another handover parameter is used to control whether the access terminal monitors for signals from other access points. For example, this monitoring may be triggered whenever the signal quality from the current serving access point drops below a threshold signal quality (i.e., represented by a corresponding handover parameter).

Handover parameters also may be used to ensure that a handover decision is not based on a transient condition. For example, a handover parameter (e.g., a time-to-trigger) may specify an amount of time that another handover condition (e.g., target RSSI>serving RSSI) needs to be met before handover is actually triggered. In some aspects, a time-to-trigger parameter determines a duration, within which the signal quality of a target access point modified by the corresponding hysteresis parameter should exceed that of a current access point to decide the handover.

Handover parameters such as these should be properly set to ensure that handover of an access terminal is performed in a reliable manner. If the handover parameters are not properly set, the access terminal may be subjected to handover issues such as FHO, TLHO, and TEHO.

In accordance with the teachings herein, the access terminal 102 employs handover parameter adaptation 110 that adapts handover parameters that are used to determine whether and/or how to handover the access terminal from one access point to another. To this end, the handover parameter adaptation 110 keeps track of handover issues associated with handover between specific access points and adapts the handover parameter(s) to be used for subsequent handover between those access points, if called for, in an attempt to mitigate the handover issues.

As discussed herein, handover may occur between different access points over time. For example, when the access terminal 102 is served by the access point 104, the access terminal 102 may be handed-over to the access point 106 at various points in time (e.g., when the access terminal moves closer to the access point 106). In addition, the access terminal 102 may be handed-over to the access point 108 at various points in time (e.g., when the access terminal moves closer to the access point 108). Similarly, when the access terminal 102 is served by the access point 106, the access terminal 102 may be handed-over to the access point 104 at various points in time (e.g., when the access terminal moves closer to the access point 104). In addition, the access terminal 102 may be handed-over to the access point 108 at various points in time (e.g., when the access terminal moves closer to the access point 108).

To provide improved handover performance, the access terminal 102 uses different sets of handover parameters for handover between different pairs of access points. Consequently, the handover parameter adaptation 110 tracks handover issues on an access point pair basis and adapts the handover parameters for that access point pair, when indicated, to mitigate the handover issues.

In addition, the handover parameter adaptation 110 may selectively store handover parameters for use during subsequent handover operations. For example, in the event handover adaptation occurs (or occurs relatively frequently), the handover parameter adaptation 110 may store the adapted handover parameters. In this way, subsequent iterations of the handover parameter adaptation procedure need not start from scratch, thereby improving the efficiency of handover adaptation at the access terminal.

Figure 2:
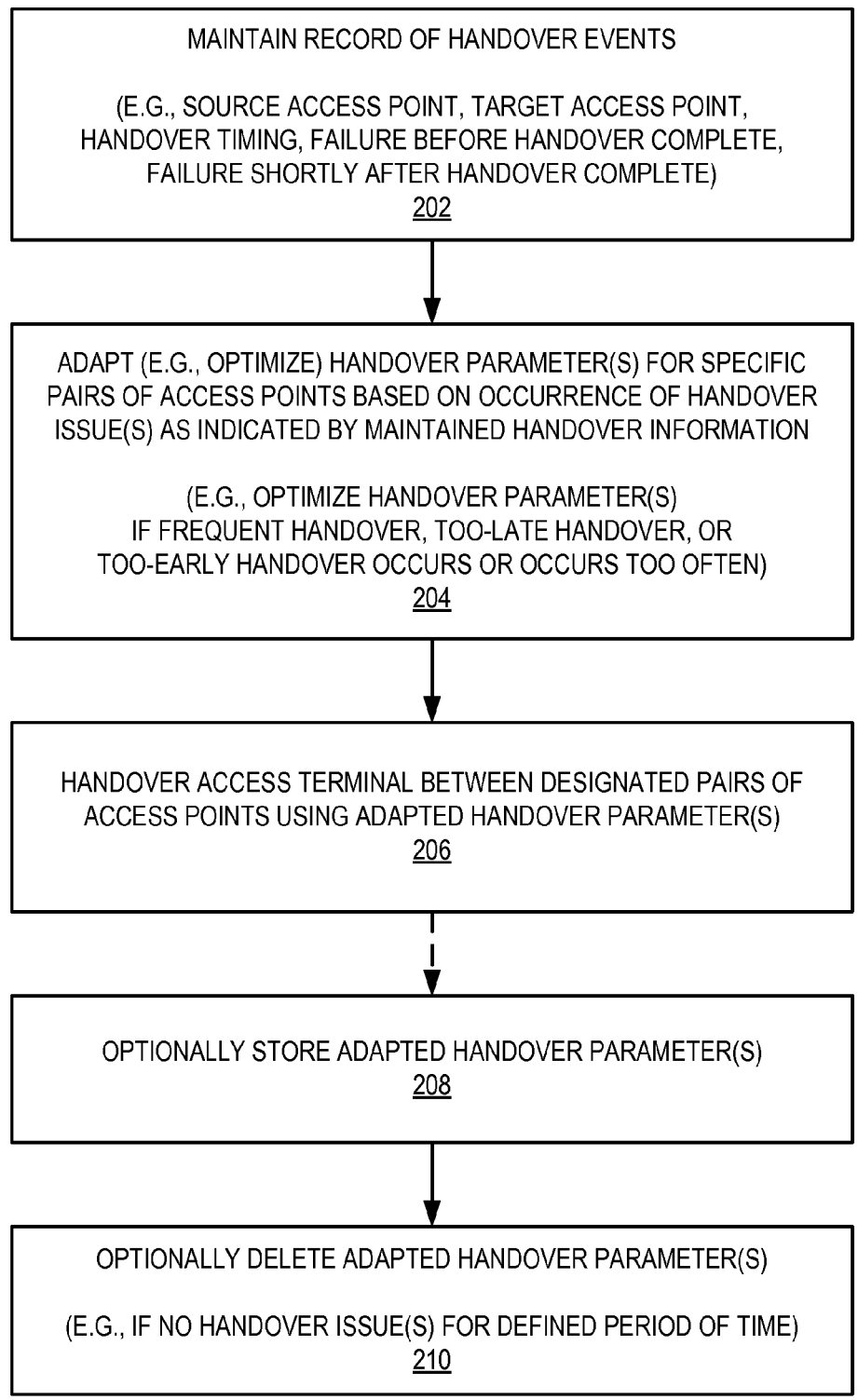
FIG. 2 is a flowchart of several sample aspects of handover parameter adaptation.

FIG. 2 illustrates an overview of sample operations that may be employed to adapt handover parameters in accordance with the teachings herein. For purposes of illustration, the operations of FIG. 2 (or any other operations discussed or taught herein) may be described as being performed by specific components (e.g., by an access terminal). However, these operations may be performed by other types of components and may be performed using a different number of components in other implementations. Also, it should be appreciated that one or more of the operations described herein may not be employed in a given implementation. For example, one entity may perform a subset of the operations and pass the result of those operations to another entity.

As represented by block 202 of FIG. 2, an access terminal maintains a record of handover events. For example, for a given handover of the access terminal, the access terminal may record the identity of the source access point, the identity of the target access point, the timing of the handover (e.g., the time at which handover was initiated), whether the handover failed before completion (e.g., the handover was commenced, but the access terminal experienced radio link failure before the handover completed), and whether the handover failed shortly after the handover was completed (e.g., the access terminal experience radio link failure within 5 seconds after completing the handover).

As represented by block 204, the access terminal adapts (e.g., optimizes) the handover parameter(s) for specific pairs of access points based on the occurrence of one or more handover issues indicated for each access point pair by the handover information maintained at block 202. For example, in some implementations, a handover parameter is adapted whenever a handover issue occurs. As another example, in some implementations, a handover parameter is adapted if a handover issue occurs a defined number of times within a defined period of time (e.g., 3 or more times in a day). In this latter case, an access terminal may maintain one or more trigger parameters corresponding to these defined values (e.g., the defined number of times and the defined period of time).

Various techniques may be employed to configure an access terminal with one or more trigger parameters that the access terminal uses for determining whether to adapt and/or store a handover parameter. For example, an access terminal may be configured with such a trigger parameter during manufacture (e.g., via a manufacturing configuration apparatus at a factory). As another example, an access point may configure an access terminal with a trigger parameter (e.g., by sending a configuration message including the parameter to the access terminal). As yet another example, a network entity (e.g., a server) may configure an access terminal with a trigger parameter (e.g., by sending a configuration message including the parameter to the access terminal via a serving access point). Thus, an access terminal may be configured in various ways to receive trigger parameters defined by another apparatus (e.g., such parameters may be received via radiofrequency (RF) signaling, via a programming interface, etc.)

A trigger parameter for handover adaptation may take various forms. For example, a threshold quantity parameter may specify the number of handover issue occurrences (e.g., once, 3 times, etc) that trigger adaptation of a handover parameter. In addition, a time duration parameter may specify a period of time over which the specified number of handover issue occurrences is to be counted (e.g., 5 minutes, 1 day, etc.). Other trigger parameters for handover adaptation may be employed in other implementations.

The trigger parameters and access terminal configuration techniques described herein are applicable to any type of handover issue. For example, these trigger parameters and configuration techniques may be employed in conjunction with frequent handover, too-early handover, too-late handover, or any other type of handover issue.

It should be appreciated that a handover issue may only be indicated for some of the access point pairs between which the access terminal was handed-over. For those access point pairs where there was no handover issue (e.g., over the last day, or week, etc.), handover parameter adaptation might not be invoked.

Several examples of handover parameter adaptation for different types of handover issues follow. For purposes of explanation, these operations are described for a single pair of access points. It should be appreciated that comparable operations will be performed for each applicable access point pair.

For FHO, the access terminal maintains a record of when handover of the access terminal occurred between the two access points. Consequently, the access terminal may determine how many handovers occurred over a defined period of time (e.g., within the last 'X' seconds). If the number of handovers that occurred between the access point pair during the defined period of time is greater than or equal to a threshold (e.g., 3 handovers within 5 minutes), frequent handover (FHO) is indicated (i.e., detected by the access terminal).

In the event FHO is indicated (e.g., once or frequently), the access terminal will adapt one or more of the handover parameters that are used to decide whether and/or how to handover the access terminal from one of these access points to the other. Thus, if the access terminal is associated with these two access points in the future, the access terminal will use the adapted handover parameters. As mentioned above, in some cases, a handover parameter is adapted whenever FHO is indicated. That is a single occurrence of FHO may trigger adaptation of the handover parameter(s). In other cases, handover parameter adaptation is triggered if the FHO event occurs too frequently (e.g., 3 or more times per day). This latter handover issue may be referred to as frequent FHO (F-FHO).

Several examples illustrating how specific handover parameters may be adapted follow. For convenience, these examples involve the detection of FHO. It should be appreciated, however, that these same concepts may apply to detection of F-FHO.

An access terminal may employ a first channel quality threshold (e.g., Hys) that is used to decide whether a potential target access point provides better service than the current serving access point. For example, by default, the first channel quality threshold may specify that the RSSI of the potential target access point needs to be at least 1 dB higher than the RSSI of the serving access point.

Upon detection of FHO, the access terminal may increase the first channel quality threshold (e.g., by a defined step size) to reduce the possibility of FHO. By increasing this threshold, the access terminal will not be as readily handed-over to the potential target access point since an even higher signal quality from the potential target access point (relative to the serving access point) will be required to trigger handover.

An access terminal may employ a first time-to-trigger threshold that controls how long the first channel quality threshold condition needs to be met before triggering handover. For example, by default, the first time-to-trigger threshold may specify that the RSSI of the potential target access point needs to be at least 1 dB higher than the RSSI of the serving access point for at least 100 milliseconds.

Upon detection of FHO, the access terminal may increase the first time-to-trigger threshold (e.g., by a defined step size) to reduce the possibility of FHO. By increasing this threshold, the access terminal will not be as readily handed-over to the potential target access point since the higher signal quality from the potential target access point will need to be present for a longer period of time to trigger handover.

An access terminal also may employ a second channel quality threshold that is used to decide whether the access terminal should commence scanning for a potential target access point. For example, by default, the second channel quality threshold may specify that scanning should commence if the RSSI of the current serving access point is less than or equal to a certain level (e.g., −50 db).

Upon detection of FHO, the access terminal may decrease the second channel quality threshold (e.g., by a defined step size) to reduce the possibility of FHO. By decreasing this threshold, the access terminal will not be as readily handed-over to the potential target access point since an even lower signal quality from the current serving access point will be required to trigger scanning for potential targets.

An access terminal also may employ a second time-to-trigger threshold that controls how long the second channel quality threshold condition needs to be met before triggering scanning. For example, by default, the first time-to-trigger threshold may specify that the RSSI of the serving access point needs to be below the threshold amount for at least 100 milliseconds.

Upon detection of FHO, the access terminal may increase the second time-to-trigger threshold (e.g., by a defined step size) to reduce the possibility of FHO. By increasing this threshold, the access terminal will not be as readily handed-over to the potential target access point since the lower signal quality from the serving access point will need to be present for a longer period of time to trigger scanning for potential targets.

Referring now to TLHO, the access terminal maintains a record of whether (and, optionally, when) TLHO occurred for handover of the access terminal from a specific access point of the pair to the other access point of the pair. Of note, the access terminal may maintain separate information and handover parameters for the two different handover directions that are possible between two access points (i.e., from a first access point to a second access point, or vice versa). Based on the maintained information, the access terminal determines whether TLHO occurred and, optionally, how may TLHOs occurred over a defined period of time (e.g., within the last 'X' hours). In the latter case, if the number of TLHOs that occurred during the defined period of time are greater than or equal to a threshold (e.g., 2 TLHOs within 2 hours), frequent too-late handover (F-TLHO) is indicated.

In the event TLHO (or F-TLHO) is indicated, the access terminal will adapt one or more of the handover parameters that are used to decide whether and/or how to handover the access terminal from one access point to the other. Thus, if the access terminal is associated with these two access points in the future, the access terminal will use the adapted handover parameters.

Several examples illustrating how specific handover parameters may be adapted follow. For convenience, these examples involve the detection of F-TLHO. It should be appreciated, however, that these same concepts may apply to detection of TLHO.

Upon detection of F-TLHO, the access terminal may decrease the first channel quality threshold discussed above (e.g., by a defined step size) to reduce the possibility of F-TLHO. By decreasing this threshold, the access terminal will be more readily handed-over to the potential target access point since a lower signal quality from the potential target access point (relative to the serving access point) will be required to trigger handover.

Upon detection of F-TLHO, the access terminal may decrease the first time-to-trigger threshold discussed above (e.g., by a defined step size) to reduce the possibility of F-TLHO. By decreasing this threshold, the access terminal will be more readily handed-over to the potential target access point since the signal quality level from the potential target access point that triggers handover need not be present for as long a period of time.

Upon detection of F-TLHO, the access terminal may increase the second channel quality threshold discussed above (e.g., by a defined step size) to reduce the possibility of F-TLHO. By increasing this threshold, the access terminal will be more readily handed-over to the potential target access point since the current serving access point will need to maintain a higher signal quality to prevent the access terminal from being triggered to commence scanning for potential targets.

Upon detection of F-TLHO, the access terminal may decrease the second time-to-trigger threshold discussed above (e.g., by a defined step size) to reduce the possibility of F-TLHO. By decreasing this threshold, the access terminal will be more readily handed-over to the potential target access point since a drop in the signal quality from the serving access point that falls below the second channel quality threshold need not be present for as long a period of time before the access terminal is triggered to commence scanning for potential targets.

With regard to TEHO, the access terminal maintains a record of whether (and, optionally, when) TEHO occurred for handover of the access terminal from a specific access point of the pair to the other access point of the pair. Again, the access terminal may maintain separate information and handover parameters for the two different handover directions that are possible between two access points (i.e., from a first access point to a second access point, or vice versa). Based on the maintained information, the access terminal determines whether TEHO occurred and, optionally, how may TEHOs occurred over a defined period of time (e.g., within the last 'X' hours). In the latter case, if the number of TEHOs that occurred during the defined period of time are greater than or equal to a threshold (e.g., 2 TEHOs within 2 hours), frequent too-early handover (F-TEHO) is indicated.

In the event TEHO (or F-TEHO) is indicated, the access terminal will adapt one or more of the handover parameters that are used to decide whether and/or how to handover the access terminal from one access point to the other. Thus, if the access terminal is associated with these two access points in the future, the access terminal will use the adapted handover parameters.

Several examples illustrating how specific handover parameters may be adapted follow. For convenience, these examples involve the detection of F-TEHO. It should be appreciated, however, that these same concepts may apply to detection of TEHO.

Upon detection of F-TEHO, the access terminal may increase the first channel quality threshold discussed above (e.g., by a defined step size) to reduce the possibility of F-TEHO. By increasing this threshold, the access terminal will not be as readily handed-over to the potential target access point since an even higher signal quality from the potential target access point (relative to the serving access point) will be required to trigger handover.

Upon detection of F-TEHO, the access terminal may increase the first time-to-trigger threshold discussed above (e.g., by a defined step size) to reduce the possibility of F-TEHO. By increasing this threshold, the access terminal will not be as readily handed-over to the potential target access point since the higher signal quality from the potential target access point will need to be present for a longer period of time to trigger handover.

Upon detection of F-TEHO, the access terminal may decrease the second channel quality threshold discussed above (e.g., by a defined step size) to reduce the possibility of F-TEHO. By decreasing this threshold, the access terminal will not be as readily handed-over to the potential target access point since an even lower signal quality from the current serving access point will be required to trigger scanning for potential targets.

Upon detection of F-TEHO, the access terminal may increase the second time-to-trigger threshold discussed above (e.g., by a defined step size) to reduce the possibility of F-TEHO. By increasing this threshold, the access terminal will not be as readily handed-over to the potential target access point since the lower signal quality from the serving access point will need to be present for a longer period of time to trigger scanning for potential targets.

Referring now to block 206 of FIG. 2, as mentioned above, the access terminal uses the adapted handover parameter(s) for handover of the access terminal between the corresponding pair of access points.

The adaptation of any handover parameter may be repeated in the event a handover issue persists after adaptation. For example, for subsequent handover operations, the access terminal may maintain a record of the handover event (block 202) and further adapt the handover parameter(s), if warranted (block 204).

As represented by block 208, the access terminal may optionally store an adapted handover parameter for use during subsequent handover operations. In some implementations, every adaptation of a handover parameter is stored. For example, if the access terminal determines that handover parameter adaptation has occurred for a given pair of access points, the access terminal may store the adapted handover parameter(s) for use whenever the access terminal is associated with the corresponding access points in the future. In some implementations, a handover parameter may only be stored if the adaptation of that handover parameter occurs too frequently. For example, an access terminal may maintain the history of handover parameter adaptation for a period of time (e.g., a number of seconds, minutes, hours, etc.). If the access terminal then determines that handover parameter adaptation occurs too frequently for a given pair of access points, the access terminal may store the adapted handover parameter(s) for use whenever the access terminal is associated with the corresponding access points in the future. For example, the access terminal may store the handover parameter(s) if the number of adaptations meets or exceeds a threshold number.

As represented by block 210, at some point in time, an adapted handover parameter may be deleted (e.g., forgotten). For example, if there are no handover issues associated with a given access point pair for a defined period of time (e.g., due to the improved handover parameters or due to the access terminal not associating with either access point), any handover parameter for that pair that has been adapted may be deleted to conserve memory space at the access terminal (e.g., the memory space previously allocated for the adapted handover parameter is de-allocated). Subsequently, a default value of the handover parameter (e.g., specified by the system) may be used for handover of the access terminal.

It should also be appreciated that handover parameters may not be maintained for subsequent use in some implementations. For example, after leaving both access points of a given access point pair, an access terminal may initially use default handover parameters if the access terminal associates with those access points again.

With the above in mind, FIGS. 3-6 illustrate examples of additional details that may be employed to facilitate handover parameter adaptation in accordance with the teachings herein. For purposes of illustration, these operations are described as being performed by an access terminal (e.g., an IEEE 802.11-based STA). It should be appreciated, however, that these operations may be performed by some other type of apparatus that is subject to handover. In addition, an apparatus such as a processing system, an ASIC, a system-on-a-chip, etc., (e.g., a component of an access terminal or other apparatus) deemed to be subject to handover may perform these operations. Also, for purposes of explanation, the following operations are described for a single pair of access points. Comparable operations may be performed for each applicable access point pair.

Figure 3:
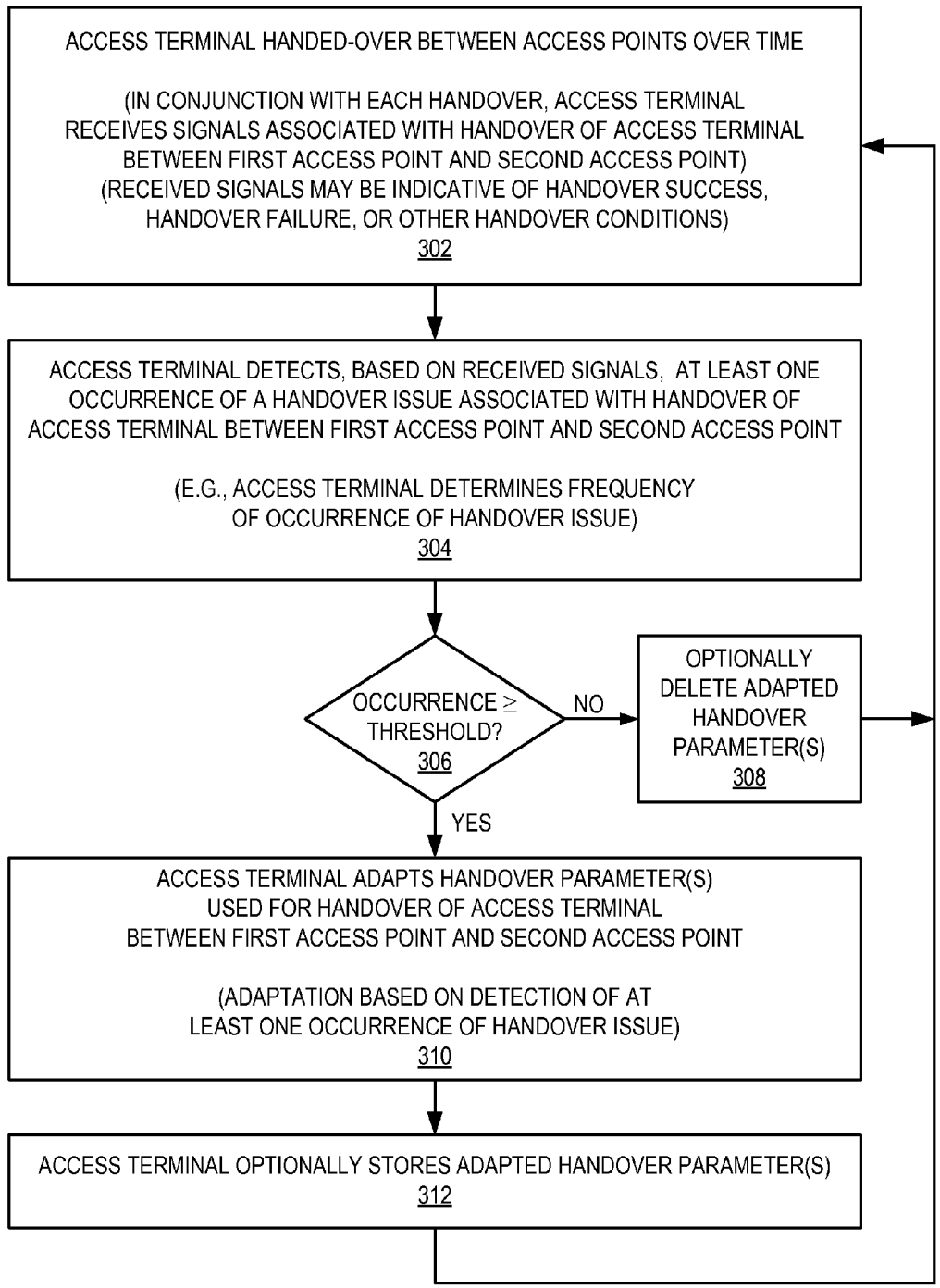
FIG. 3 is a flowchart of several sample aspects of operations involving adaptation of a handover parameter based on the occurrence of a handover issue.

Referring initially to FIG. 3, in some aspects, this flowchart describes sample operations that may be employed in conjunction with adapting a handover parameter.

As represented by block 302, an access terminal is handed-over between a first access point and a second access point over some period of time. As discussed herein, this may occur repeatedly.

In conjunction with each handover of the access terminal between the first access point and the second access point, the access terminal receives signals associated with the handover between the access points. In some aspects, received signals may be indicative of the success or failure of the handover (e.g., a handover complete message, a handover failure message, a radio link failure message, etc.).

As represented by block 304, the access terminal detects at least one occurrence of a handover issue associated with handover of the access terminal between the first and second access points. As discussed herein, action on the part of the access terminal may be triggered upon detecting a single occurrence of a handover issue or upon detecting several occurrences of the handover issue. As an example of the latter case, in some implementations, the access terminal determines a frequency of occurrence of a handover issue associated with the handover of the access terminal between the first access point and the second access point. The detection of an occurrence of a handover issue may involve, for example, monitoring handover-related signals and, optionally, operations at the access terminal to determine whether the handover issue has occurred. Thus, in some aspects, the access terminal detects the occurrence of the handover issue based on the signals received at block 302 and, optionally, other received signals.

As discussed herein, a handover issue may take various forms. For example, the handover issue may involve frequent handover between the first access point and the second access point. As another example, the handover issue may involve failed handover (e.g., too-late handover or too-early handover).

As represented by block 306, the access terminal may determine whether the detection of at least one occurrence of a handover issue meets a threshold test. For example, in some implementations, the access terminal determines whether a single occurrence of a handover issue has been detected. In some implementations, the access terminal determines whether a specified number of a handover issues have been detected. In an implementation where the access terminal determines a frequency of occurrence of a handover issue at block 304, the operations of block 306 may involve the access terminal comparing the determined frequency with a frequency threshold.

As represented by block 308, if the handover issue has not occurred the requisite number of times (e.g., one or more times) or does not occur too frequently, the access terminal may check to see whether any adapted handover parameters should be deleted, whereupon the access terminal will return to using a default value of each handover parameter for any subsequent handover operations between the first and second access points. For example, as discussed herein, an adapted handover parameter may be deleted if there have not been any handover issues for a certain period of time. The operational flow may then continue back to blocks 302 and 304 where the access terminal continues to monitor its handover operations.

As represented by block 310, if the result of the test of block 306 indicates that action is to be taken to mitigate the handover issue, the access terminal adapts at least one handover parameter used for handover of the access terminal between the first access point and the second access point. Thus, the adaptation of the at least one handover parameter is based on the detection of one or more occurrences of the handover issue. For example, in some implementation, a handover parameter is adapted every time a handover issue is detected. As another example, in some implementations, the adaptation of the at least one handover parameter is based on the determined frequency of occurrence of the handover issue. For example, adaptation of the handover parameter(s) may be triggered if the frequency of occurrence of the handover issue is greater than or equal to a threshold frequency.

As represented by block 312, the access terminal optionally stores the adapted handover parameter(s). The operational flow may then continue back to blocks 302 and 304 where the access terminal continues to monitor its handover operations.

Figure 4:
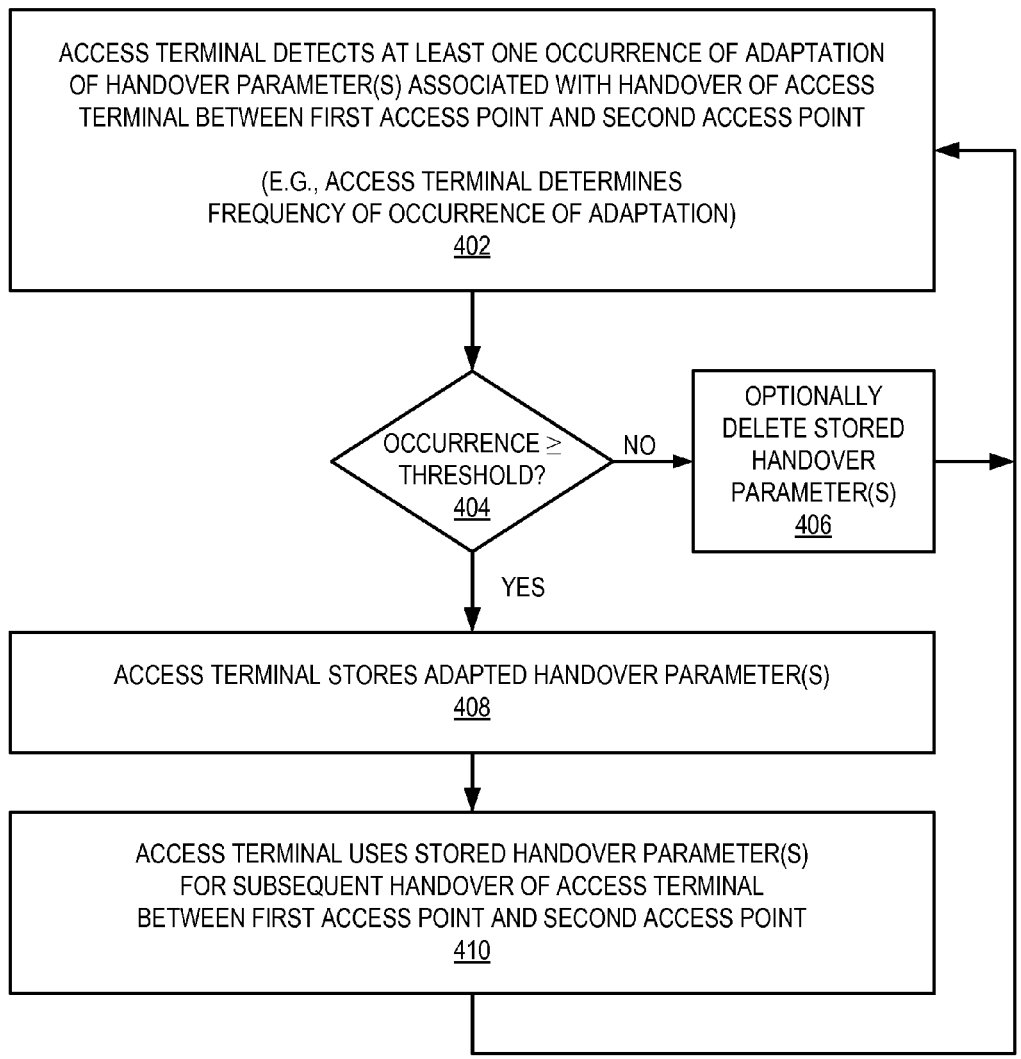
FIG. 4 is a flowchart of several sample aspects of operations involving storing an adapted handover parameter as a result of the handover parameter being adapted.

Referring now to FIG. 4, in some aspects, this flowchart describes sample operations that may be employed in conjunction with determining whether to store a handover parameter.

As represented by block 402, the access terminal detects at least one occurrence of adaptation of at least one handover parameter associated with handover of the access terminal between the first and second access points. As discussed herein, action on the part of the access terminal may be triggered upon detecting a single occurrence of a handover parameter adaptation or upon detecting several occurrences of handover parameter adaptation. As an example of the latter case, in some implementations, the access terminal determines a frequency of occurrence of the adaptation of the at least one handover parameter. The detection of an occurrence of handover parameter adaptation may involve, for example, a function (e.g., a process executed by a processing system) that performs the handover parameter adaptation providing an indication of the adaptation to another function that controls the storing of adapted handover parameters.

As represented by block 404, the access terminal may determine whether the detection of at least one occurrence of adaptation of one or more handover parameters meets a threshold test. For example, in some implementations, the access terminal determines whether a single occurrence of a handover parameter adaptation has been detected. In some implementations, the access terminal determines whether a specified number of handover parameter adaptations have been detected. In an implementation where the access terminal determines a frequency of occurrence of handover parameter adaptation at block 402, the operations of block 404 may involve the access terminal comparing the determined frequency with a frequency threshold.

As represented by block 406, if handover parameter adaptation has not occurred the requisite number of times (e.g., one or more times) or does not occur too frequently, the access terminal may check to see whether any stored handover parameters should be deleted, whereupon the access terminal will return to using a default value of each handover parameter for any subsequent handover operations between the first and second access points. For example, a stored handover parameter may be deleted if the frequency of handover parameter adaptation remains below a threshold level for a certain period of time. The operational flow may then continue back to blocks 402 and 404 where the access terminal continues to monitor whether (e.g., the frequency with which) its handover parameters are being adapted.

As represented by block 408, if result of the test of block 404 indicates that handover parameter adaptation has occurred or is occurring occur too frequently, the access terminal stores the adapted at least one handover parameter. Thus, an adapted handover parameter is stored as a result of the handover parameter being adapted. For example, in some implementations, a handover parameter is stored every time the handover parameter is adapted. As another example, in some implementations, the storing of an adapted handover parameter is based on the determined frequency of occurrence of the handover parameter adaptation. For example, an adapted handover parameter may be stored if the frequency of occurrence of the adaptation is greater than or equal to a threshold frequency.

As represented by block 410, the access terminal may then use the stored at least one handover parameter for subsequent handover of the access terminal between the first access point and the second access point.

Figure 5:
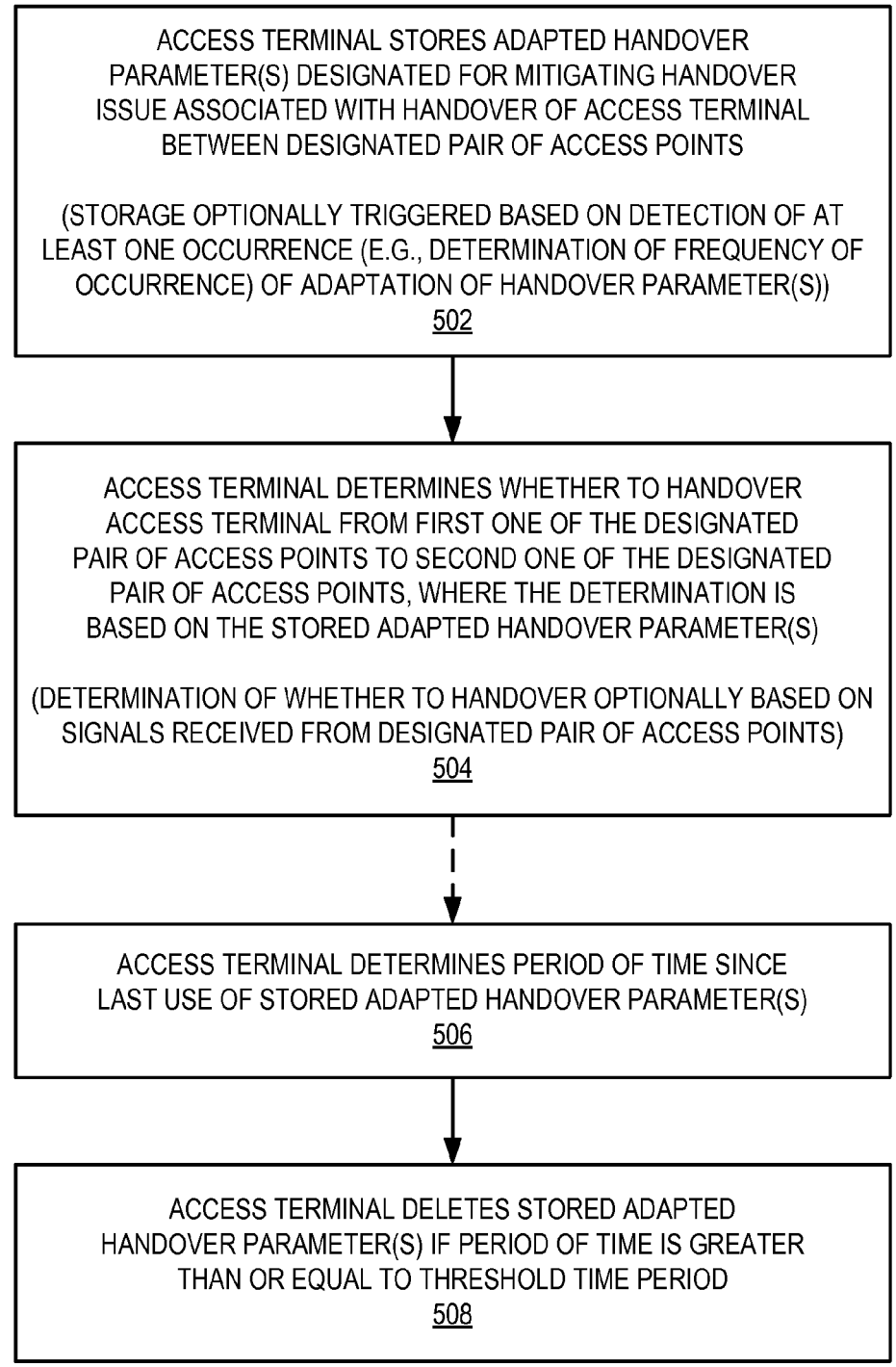
FIG. 5 is a flowchart of several sample aspects of operations relating to maintaining a handover parameter.

Referring to FIG. 5, in some aspects, this flowchart describes sample operations that may be employed in conjunction with using a stored handover parameter to determine whether to handover an access terminal to another access point.

As represented by block 502, the access terminal stores at least one adapted handover parameter at an access terminal. As discussed herein, the at least one adapted handover parameter is designated for mitigating a handover issue associated with handover of the access terminal between a designated pair of access points. Also as discussed herein, this storage of the adapted handover parameter(s) may be triggered based on detection of at least one occurrence of adaptation of at least one handover parameter associated with handover of the access terminal between the designated pair of access points. For example, the storage may be triggered based on a single adaptation of the handover parameter(s), based on a determination of a frequency of occurrence of adaptation of the handover parameter(s), and so on.

As represented by block 504, the access terminal determines whether to handover the access terminal from a first one of the designated pair of access points to a second one of the designated pair of access points. As discussed herein, this determination is based on the stored at least one adapted handover parameter. For example, the access terminal may use an adapted hysteresis parameter and/or an adapted time-to-trigger parameter to determine whether to trigger handover.

In some aspects, a determination of whether to handover the access terminal may be based on received signals. As discussed above, the access terminal may receive signals from the access points to determine the relative quality provided by the access points (e.g., by measuring the received signal quality of the signals from the access points). For example, if the at least one adapted handover parameter comprises a signal quality threshold for identifying a target access point, the determination of whether to handover the access terminal may comprise receiving a signal from a potential target access point, determining whether the potential target access point is one of the designated pair of access points, and determining whether signal quality of the received signal meets or exceeds the signal quality threshold. As another example, if the at least one adapted handover parameter comprises a signal quality threshold for triggering scanning for a target access point, the determination of whether to handover the access terminal (in particular, a determination whether to trigger scanning for a target access point) may comprise receiving a signal from a current serving access point for the access terminal, determining whether the current serving access point is one of the designated pair of access points, and determining whether signal quality of the received signal meets or falls below the signal quality threshold.

As represented by blocks 506 and 508, at some later point in time, the access terminal determines whether to maintain the stored adapted handover parameter(s). As represented by block 506, the access terminal determines a period of time that the stored at least one adapted handover parameter has not been used since a last use. As represented by block 508, the access terminal deletes the stored at least one adapted handover parameter if the period of time is greater than or equal to a threshold time period.

Figure 6:
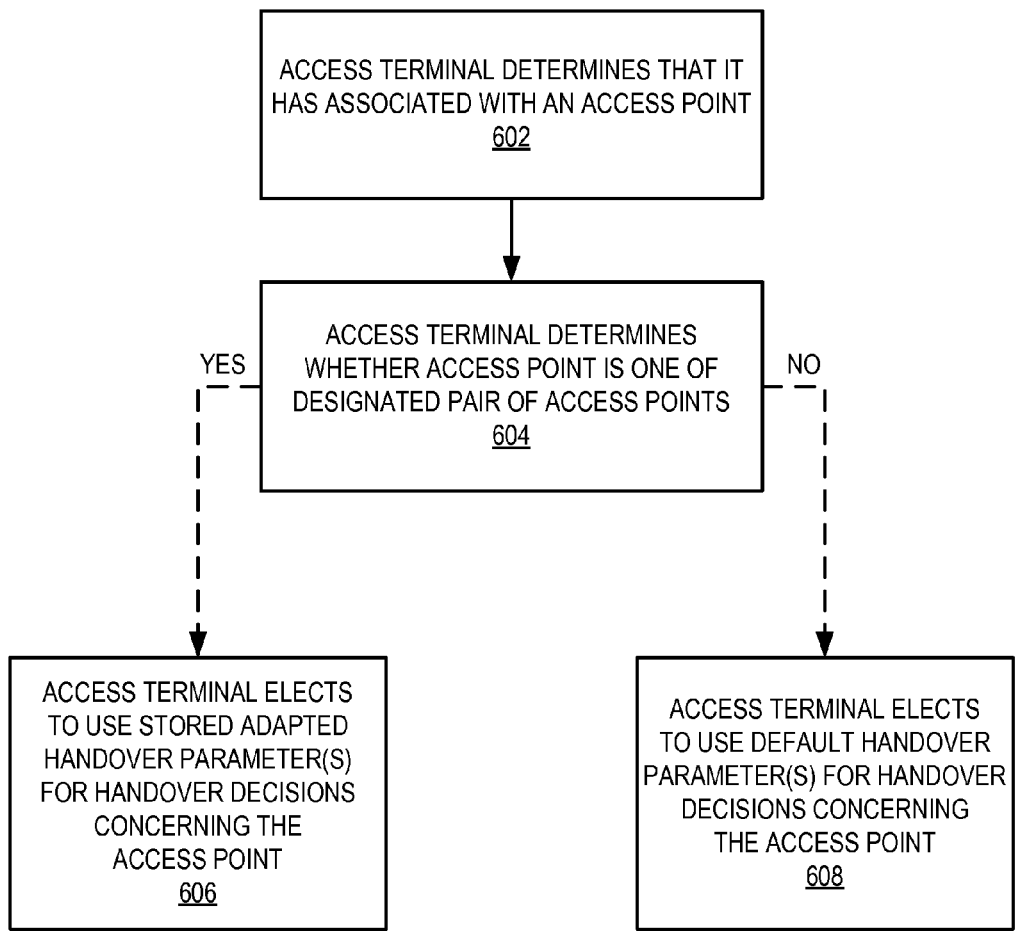
FIG. 6 is a flowchart of several sample aspects of operations involving determining whether to use a stored handover parameter.

Referring to FIG. 6, in some aspects, this flowchart describes sample operations that may be employed in conjunction with determining whether to use a stored handover parameter or a default handover parameter.

As represented by block 602, the access terminal determines that is has associated with an access point. For example, that access terminal may generate an appropriate indication whenever it completes an association procedure with an access point.

As represented by block 604, the access terminal determines whether the access point is one of a designated pair of access points for which stored (i.e., adapted) handover parameters are being maintained by the access terminal. For example, the access terminal may check a database to determine whether the current serving access point and the newly associated access point are one of the access point pairs for which adapted handover parameters are currently stored.

As represented by block 606, if the access point is one of the designated pair of access points, the access terminal elects to use the stored at least one adapted handover parameter for handover decisions concerning the access point.

As represented by block 608, if not, the access terminal instead elects to use at least one default handover parameter for handover decisions concerning the access point.

Figure 7:
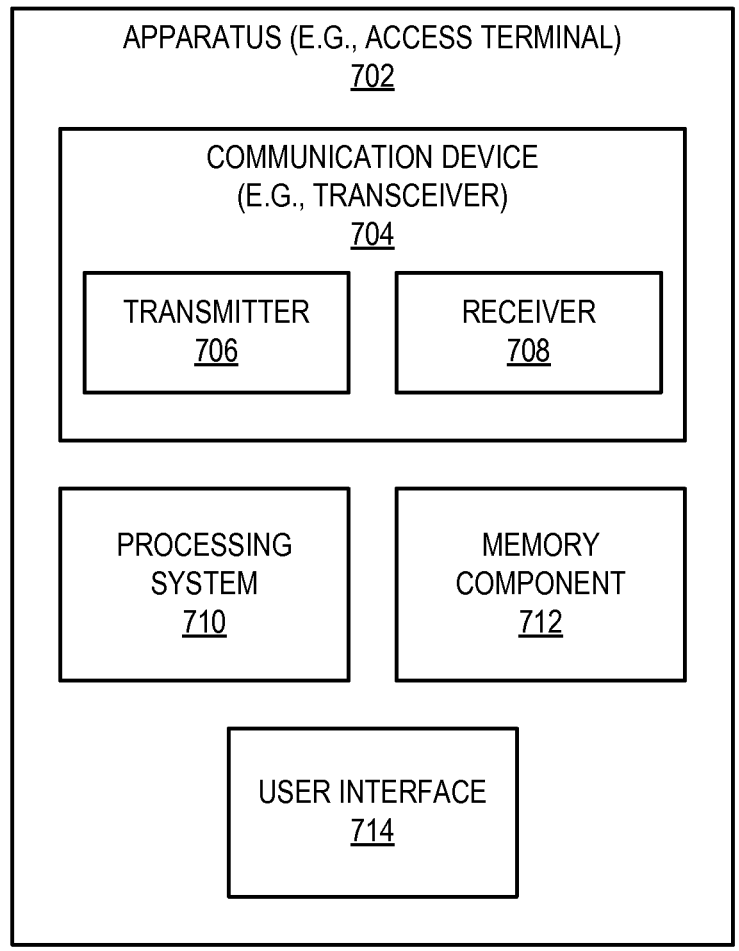
FIG. 7 is a simplified block diagram of several sample aspects of components that may be employed in communication nodes.

FIG. 7 illustrates several sample components (represented by corresponding blocks) that may be incorporated into an apparatus 702 (e.g., corresponding to the access terminal 102 of FIG. 1) to perform parameter adaptation operations as taught herein. It should be appreciated that these components may be implemented in different types of apparatuses in different implementations (e.g., in an ASIC, in a system-on-a-chip (SoC), etc.). The described components also may be incorporated into other nodes in a communication system. For example, other nodes in a system may include components similar to those described for the apparatus 702 to provide similar functionality. Also, a given node may contain one or more of the described components. For example, an apparatus may include multiple transceiver components that enable the apparatus to operate on multiple carriers and/or communicate via different technologies.

The apparatus 702 includes at least one wireless communication device (represented by the communication device 704) for communicating with other nodes via at least one designated radio access technology. The communication device 704 includes at least one transmitter 706 for sending signals (e.g., signals associated with handover, messages, reports, indications, information, and so on) and at least one receiver 708 for receiving signals (e.g., signals associated with handover, parameters, messages, requests, pilot signals, indications, information, and so on). A transmitter 706 and a receiver 708 may comprise an integrated device (e.g., embodied as a transmitter circuit and a receiver circuit of a single communication device) in some implementations, may comprise a separate transmitter device and a separate receiver device in some implementations, or may be embodied in other ways in other implementations.

The apparatus 702 also includes other components that may be used in conjunction with parameter adaptation operations as taught herein. For example, the apparatus 702 includes a processing system 710 for providing functionality relating to parameter adaptation and for providing other processing functionality. Examples of such functionality include one or more of: detecting at least one occurrence of a handover issue, determining a frequency of occurrence of a handover issue, adapting at least one handover parameter, determining a frequency of occurrence of the adaptation of the at least one handover parameter, detecting at least one occurrence of the adaptation of the at least one handover parameter, storing at least one adapted handover parameter, using the stored at least one handover parameter, detecting frequent handover, determining whether to handover the access terminal, determining a period of time that the stored at least one adapted handover parameter has not been used, deleting the stored at least one adapted handover parameter, triggering the storing of the at least one adapted handover parameter, determining that the access terminal has associated with an access point, determining whether an access point is one of a designated pair of access points, electing to use the stored at least one handover parameter for handover decisions, or determining whether to trigger scanning for a target access points. The apparatus 702 also includes a memory component 712 (e.g., including a memory device) for maintaining information (e.g., information, handover parameters, thresholds, other parameters, and so on). In addition, the apparatus 702 includes a user interface device 714 for providing indications (e.g., audible and/or visual indications) to a user and/or for receiving user input (e.g., upon user actuation of a sensing device such a keypad, a touch screen, a microphone, and so on).

For convenience, the apparatus 702 is shown in FIG. 7 as including components that may be used in the various examples described herein. In practice, the illustrated blocks may have different functionality in different implementations. For example, functionality of the block 710 based on FIG. 3 may be different from functionality based on FIG. 5.

The components of FIG. 7 may be implemented in various ways. In some implementations, the components of FIG. 7 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 704, 710, 712, and 714 may be implemented by processor and memory component(s) of the apparatus (e.g., by execution of appropriate code and/or by appropriate configuration of processor components).

Figure 8:
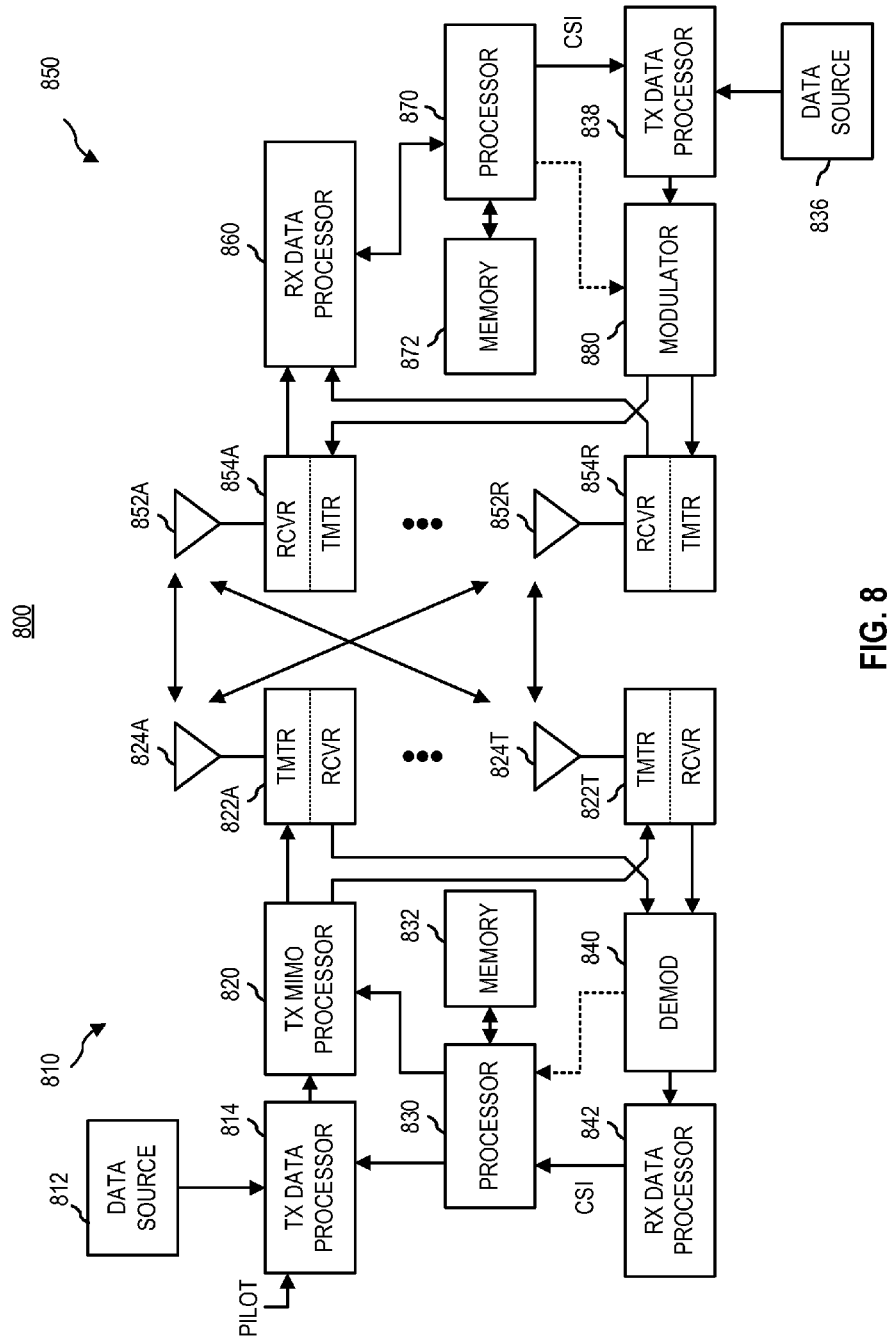
FIG. 8 is a simplified block diagram of several sample aspects of communication components.

FIG. 8 illustrates in more detail sample components that may be employed in a pair of wireless nodes of a MIMO system 800. In this example, the wireless nodes are labeled as a wireless device 810 (e.g., an access point) and a wireless device 850 (e.g., an access terminal). It should be appreciated that a MU-MIMO system will include other devices (e.g., access terminals) similar to the wireless device 850. To reduce the complexity of FIG. 8, however, only one such device is shown.

The MIMO system 800 employs multiple ($N_T$) transmit antennas and multiple ($N_R$) receive antennas for data transmission. A MIMO channel formed by the $N_T$ transmit and $N_R$ receive antennas is decomposed into $N_S$ independent channels, which are also referred to as spatial channels, where $N_S \leq \min\{N_T, N_R\}$.

The MIMO system 800 supports time division duplex (TDD) and/or frequency division duplex (FDD). In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Referring initially to the device 810, traffic data for a number of data streams is provided from a data source 812 to a transmit (TX) data processor 814. Each data stream is then transmitted over a respective transmit antenna.

The TX data processor 814 formats, codes, and interleaves the traffic data for each data stream based on a particular coding scheme selected for that data stream to provide coded data. The coded data for each data stream is multiplexed with pilot data using OFDM techniques or other suitable techniques. The pilot data is typically a known data pattern that is processed in a known manner and used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream are typically determined by instructions performed by a processor 830. A memory 832 stores program code, data, and other information used by the processor 830 or other components of the device 810.

The modulation symbols for all data streams are then provided to a TX MIMO processor 820, which further processes the modulation symbols (e.g., for OFDM). The TX MIMO processor 820 then provides $N_T$ modulation symbol streams to $N_T$ transceivers (XCVR) 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver (XCVR) 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive (RX) data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which precoding matrix to use (discussed below). The processor 870 formulates a reverse link message comprising a matrix index portion and a rank value portion. A memory 872 stores program code, data, and other information used by the processor 870 or other components of the device 850.

The reverse link message comprises various types of information regarding the communication link and/or the received data stream. The reverse link message is processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator (DEMOD) 840, and processed by a RX data processor 842 to extract the reverse link message transmitted by the device 850. The processor 830 then determines which precoding matrix to use for determining the beamforming weights by processing the extracted message.

In some implementations, the receive data processor 860 and/or the processor 870 performs the handover parameter adaptation operations described herein. It should be appreciated that these operations may be performed in cooperation with other components of FIG. 8 and/or by other components of FIG. 8 in some implementations.

A wireless node may include various components that perform functions based on signals that are transmitted by or received at the wireless node. For example, in some implementations a wireless node comprises a user interface configured to output an indication based on a received signal as taught herein.

A wireless node as taught herein may communicate via one or more wireless communication links that are based on or otherwise support any suitable wireless communication technology. For example, in some aspects a wireless node may associate with a network such as a local area network (e.g., a Wi-Fi network) or a wide area network. To this end, a wireless node may support or otherwise use one or more of a variety of wireless communication technologies, protocols, or standards such as, for example, Wi-Fi, WiMAX, CDMA, TDMA, OFDM, and OFDMA. Also, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects, a wireless node comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless node also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

Figure 9:
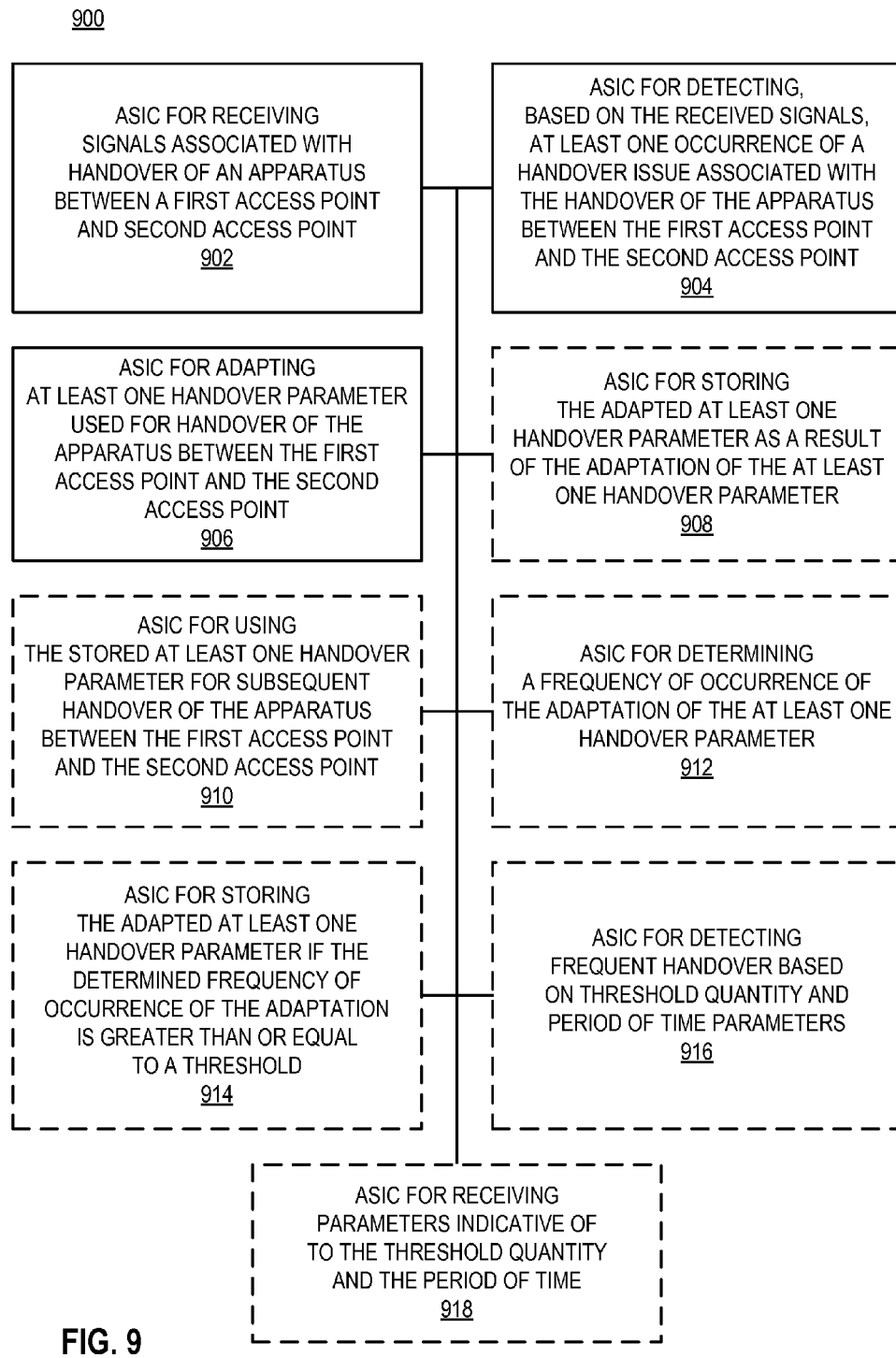
FIGS. 9 and 10 are simplified block diagrams of several sample aspects of apparatuses configured to conduct conditional channel measurement operations as taught herein.
Figure 10:

The components described herein may be implemented in a variety of ways. Referring to FIGS. 9 and 10, apparatuses 900 and 1000 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 900 includes one or more modules that may perform one or more of the functions described above with regard to various figures. For example, an ASIC for receiving signals associated with handover of an apparatus between a first access point and a second access point 902 may correspond to, for example, a receiver (e.g., comprising an RF receive chain circuit) as discussed herein. An ASIC for detecting, based on the received signals, at least one occurrence of a handover issue associated with the handover of the apparatus between the first access point and the second access point 904 may correspond to, for example, a processing system as discussed herein. An ASIC for adapting at least one handover parameter used for handover of the apparatus between the first access point and the second access point 906 may correspond to, for example, a processing system as discussed herein. An ASIC for storing the adapted at least one handover parameter as a result of the adaptation of the at least one handover parameter 908 may correspond to, for example, a processing system as discussed herein. An ASIC for using the stored at least one handover parameter for subsequent handover of the access terminal between the first access point and the second access point 910 may correspond to, for example, a processing system as discussed herein. An ASIC for determining a frequency of occurrence of the adaptation of the at least one handover parameter 912 may correspond to, for example, a processing system as discussed herein. An ASIC for storing the adapted at least one handover parameter if the determined frequency of occurrence of the adaptation is greater than or equal to a threshold frequency 914 may correspond to, for example, a processing system as discussed herein. An ASIC for detecting frequent handover based on threshold quantity and period of time parameters 916 may correspond to, for example, a processing system as discussed herein. An ASIC for receiving parameters indicative of the threshold quantity and the period of time 918 may correspond to, for example, a processing system as discussed herein.

The apparatus 1000 also includes one or more modules that may perform one or more of the functions described above with regard to various figures. For example, an ASIC for storing at least one adapted handover parameter at an apparatus 1002 may correspond to, for example, a memory component as discussed herein. An ASIC for determining whether to handover the apparatus 1004 may correspond to, for example, a processing system as discussed herein. An ASIC for determining a period of time that the stored at least one adapted handover parameter has not been used since a last use 1006 may correspond to, for example, a processing system as discussed herein. An ASIC for deleting the stored at least one adapted handover parameter if the period of time is greater than or equal to a threshold time period 1008 may correspond to, for example, a processing system as discussed herein. An ASIC for determining a frequency of occurrence of adaptation of at least one handover parameter 1010 may correspond to, for example, a processing system as discussed herein. An ASIC for triggering the storing of the at least one adapted handover parameter based on the determined frequency of occurrence of the adaptation of the at least one handover parameter 1012 may correspond to, for example, a processing system as discussed herein. An ASIC for detecting at least one occurrence of adaptation of at least one handover parameter 1014 may correspond to, for example, a processing system as discussed herein. An ASIC for triggering the storing of the at least one adapted handover parameter based on the detection of the at least one occurrence of the adaptation 1016 may correspond to, for example, a processing system as discussed herein. An ASIC for determining that the access terminal has associated with an access point 1018 may correspond to, for example, a processing system as discussed herein. An ASIC for determining whether the access point is one of the designated pair of access points 1020 may correspond to, for example, a processing system as discussed herein. An ASIC for electing to use the stored at least one adapted handover parameter for handover decisions concerning the access point 1022 may correspond to, for example, a processing system as discussed herein. An ASIC for determining whether to trigger scanning for a target access point 1024 may correspond to, for example, a processing system as discussed herein. An ASIC for receiving signals from the designated pair of access points 1026 may correspond to, for example, a receiver as discussed herein.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes are optional.

As noted above, the apparatuses 900 and 1000 comprise one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 1000 may comprise a single device (e.g., with components 1002-1026 comprising different sections of an ASIC). As another specific example, the apparatus 1000 may comprise several devices (e.g., with the component 1002 comprising a memory device, the components 1004-1024 comprising one ASIC, and the component 1026 comprising another ASIC).

In addition, the components and functions represented by FIGS. 9 and 10 as well as other components and functions described herein, may be implemented using any suitable means. Such means are implemented, at least in part, using corresponding structure as taught herein. For example, the components described above in conjunction with the "ASIC for" components of FIGS. 9 and 10 correspond to similarly designated "means for" functionality. Thus, one or more of such means is implemented using one or more of processor components, integrated circuits, or other suitable structure as taught herein in some implementations. Several examples follow. In some aspects, means for receiving comprises a receiver. In some aspects, means for detecting comprises a processing system. In some aspects, means for determining comprises a processing system. In some aspects, means for adapting comprises a processing system. In some aspects, means for storing comprises a memory component and/or a processing system. In some aspects, means for using comprises a processing system. In some aspects, means for identifying comprises a processing system. In some aspects, means for deleting comprises a processing system. In some aspects, means for triggering comprises a processing system. In some aspects, means for electing comprises a processing system. In some aspects, means for communicating comprises a communication device.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code executable (e.g., executable by at least one computer) to provide functionality relating to one or more of the aspects of the disclosure. In some aspects, a computer program product may comprise packaging materials.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for handover parameter adaptation, comprising:
   a receiver configured to receive signals associated with handover of the apparatus between a first access point and a second access point;
   a memory component; and
   a processing system configured to:
      detect, based on the received signals, at least one occurrence of a handover issue associated with the handover of the apparatus between the first access point and the second access point, and further configured to adapt at least one handover parameter used for handover of the apparatus between the first access point and the second access point, wherein the adaptation of the at least one handover parameter is based on the detection of the at least one occurrence of the handover issue;

determine a frequency of occurrence of the adaptation of the at least one handover parameter; and store the adapted at least one handover parameter in the memory component if the determined frequency of occurrence of the adaptation is greater than or equal to a threshold frequency.

2. The apparatus of claim 1, wherein:
the detection of the at least one occurrence of the handover issue comprises determining the frequency of occurrence of the handover issue; and
the adaptation of the at least one handover parameter is based on the determined frequency of occurrence of the handover issue.

3. The apparatus of claim 1, wherein:
the detection of the at least one occurrence of the handover issue comprises determining the frequency of occurrence of the handover issue; and
the adaptation of the at least one handover parameter is triggered if the frequency of occurrence of the handover issue is greater than or equal to the threshold frequency.

4. The apparatus of claim 1, wherein:
and
the processing system is further configured to use the stored at least one handover parameter for subsequent handover of the apparatus between the first access point and the second access point.

5. The apparatus of claim 1, wherein the handover issue involves frequent handover between the first access point and the second access point.

6. The apparatus of claim 5, wherein:
the processing system is further configured to detect the frequent handover based on whether a quantity of handovers of the apparatus between the first access point and the second access point over a period of time is greater than or equal to a threshold quantity; and
the memory component is configured to receive parameters corresponding to the threshold quantity and the period of time from: a manufacturing configuration apparatus, an access point, or a server.

7. The apparatus of claim 1, wherein the handover issue involves failed handover.

8. The apparatus of claim 7, wherein the failed handover comprises too-late handover or too-early handover.

9. A method of handover parameter adaptation, comprising:
receiving, at an apparatus, signals associated with handover of the apparatus between a first access point and a second access point;
detecting, at the apparatus based on the received signals, at least one occurrence of a handover issue associated with the handover of the apparatus between the first access point and the second access point; and
adapting, at the apparatus, at least one handover parameter used for handover of the apparatus between the first access point and the second access point, wherein the adaptation of the at least one handover parameter is based on the detection of the at least one occurrence of the handover issue;
determining a frequency of occurrence of the adaptation of the at least one handover parameter; and
storing the adapted at least one handover parameter if the determined frequency of occurrence of the adaptation is greater than or equal to a threshold frequency.

10. The method of claim 9, wherein:
the detection of the at least one occurrence of the handover issue comprises determining the frequency of occurrence of the handover issue; and
the adaptation of the at least one handover parameter is based on the determined frequency of occurrence of the handover issue.

11. The method of claim 9, wherein:
the detection of the at least one occurrence of the handover issue comprises determining the frequency of occurrence of the handover issue; and
the adaptation of the at least one handover parameter is triggered if the frequency of occurrence of the handover issue is greater than or equal to the threshold frequency.

12. The method of claim 9, further comprising:
using the stored at least one handover parameter for subsequent handover of the apparatus between the first access point and the second access point.

13. The method of claim 9, wherein the handover issue involves frequent handover between the first access point and the second access point.

14. The method of claim 13, further comprising:
detecting the frequent handover based on whether a quantity of handovers of the apparatus between the first access point and the second access point over a period of time is greater than or equal to a threshold quantity; and
receiving parameters corresponding to the threshold quantity and the period of time from: a manufacturing configuration apparatus, an access point, or a server.

15. The method of claim 9, wherein the handover issue involves failed handover.

16. The method of claim 15, wherein the failed handover comprises too-late handover or too-early handover.

17. An apparatus for handover parameter adaptation, comprising:
means for receiving signals associated with handover of the apparatus between a first access point and a second access point;
means for detecting, based on the received signals, at least one occurrence of a handover issue associated with the handover of the apparatus between the first access point and the second access point;
means for adapting at least one handover parameter used for handover of the apparatus between the first access point and the second access point, wherein the adaptation of the at least one handover parameter is based on the detection of the at least one occurrence of the handover issue;
means for determining a frequency of occurrence of the adaptation of the at least one handover parameter; and
means for storing the adapted at least one handover parameter if the determined frequency of occurrence of the adaptation is greater than or equal to a threshold frequency.

18. The apparatus of claim 17, wherein:
the detection of the at least one occurrence of the handover issue comprises determining the frequency of occurrence of the handover issue; and
the adaptation of the at least one handover parameter is based on the determined frequency of occurrence of the handover issue.

19. The apparatus of claim 17, wherein:
the detection of the at least one occurrence of the handover issue comprises determining the frequency of occurrence of the handover issue; and
the adaptation of the at least one handover parameter is triggered if the frequency of occurrence of the handover issue is greater than or equal to the threshold frequency.

20. The apparatus of claim 17, further comprising:
means for using the stored at least one handover parameter for subsequent handover of the apparatus between the first access point and the second access point.

21. The apparatus of claim 17, wherein the handover issue involves frequent handover between the first access point and the second access point.

22. The apparatus of claim 21, further comprising:
means for detecting the frequent handover based on whether a quantity of handovers of the apparatus between the first access point and the second access point over a period of time is greater than or equal to a threshold quantity; and
means for receiving parameters corresponding to the threshold quantity and the period of time from: a manufacturing configuration apparatus, an access point, or a server.

23. The apparatus of claim 17, wherein the handover issue involves failed handover.

24. The apparatus of claim 23, wherein the failed handover comprises too-late handover or too-early handover.

25. A non-transitory computer-readable medium comprising code executable to:
receive, at an apparatus, signals associated with handover of the apparatus between a first access point and a second access point;
detect, at the apparatus based on the received signals, at least one occurrence of a handover issue associated with the handover of the apparatus between the first access point and the second access point;
adapt, at the apparatus, at least one handover parameter used for handover of the apparatus between the first access point and the second access point, wherein the adaptation of the at least one handover parameter is based on the detection of the at least one occurrence of the handover issue;
determine, at the apparatus, a frequency of occurrence of the adaptation of the at least one handover parameter; and
store, at the apparatus, the adapted at least one handover parameter in a memory component if the determined frequency of occurrence of the adaptation is greater than or equal to a threshold frequency.

26. An access terminal, comprising:
an antenna;
a memory component;
a receiver configured to receive, via the antenna, signals associated with handover of the access terminal between a first access point and a second access point; and
a processing system configured to:
detect, based on the received signals, at least one occurrence of a handover issue associated with the handover of the access terminal between the first access point and the second access point, and further configured to adapt at least one handover parameter used for handover of the access terminal between the first access point and the second access point, wherein the adaptation of the at least one handover parameter is based on the detection of the at least one occurrence of the handover issue;
determine a frequency of occurrence of the adaptation of the at least one handover parameter; and
store the adapted at least one handover parameter in the memory component if the determined frequency of occurrence of the adaptation is greater than or equal to a threshold frequency.

* * * * *